United States Patent
Anglin et al.

(10) Patent No.: US 8,780,726 B2
(45) Date of Patent: Jul. 15, 2014

(54) REMOTE COMMUNICATIONS DIAGNOSTICS USING ANALOG DATA ANALYSIS

(75) Inventors: Mark Anglin, Wadsworth, OH (US); Joseph Majewski, Strongsville, OH (US)

(73) Assignee: Honeywell International Inc., Morristown, NJ (US)

( * ) Notice: Subject to any disclaimer, the term of this patent is extended or adjusted under 35 U.S.C. 154(b) by 2249 days.

(21) Appl. No.: 11/306,758

(22) Filed: Jan. 10, 2006

(65) Prior Publication Data

US 2007/0159978 A1 Jul. 12, 2007

(51) Int. Cl.
*H04L 12/26* (2006.01)

(52) U.S. Cl.
USPC .......................................................... 370/241

(58) Field of Classification Search
USPC .............. 370/241; 374/141, 143; 340/310.12, 340/310.16; 700/278
See application file for complete search history.

(56) References Cited

U.S. PATENT DOCUMENTS

| | | | | |
|---|---|---|---|---|
| 4,527,247 A * | 7/1985 | Kaiser et al. | | 700/278 |
| 4,777,607 A * | 10/1988 | Maury et al. | | 700/286 |
| 4,843,084 A | 6/1989 | Parker et al. | | |
| 4,949,355 A | 8/1990 | Dyke et al. | | |
| 5,276,630 A | 1/1994 | Baldwin et al. | | |
| 5,446,677 A * | 8/1995 | Jensen et al. | | 700/277 |
| 5,682,329 A | 10/1997 | Seem et al. | | |
| 6,268,733 B1 | 7/2001 | Abbata et al. | | |
| 6,331,822 B1 * | 12/2001 | Sato et al. | | 340/3.22 |
| 6,341,493 B1 | 1/2002 | Shepeck et al. | | |
| 6,356,827 B1 | 3/2002 | Davis et al. | | |
| 6,385,510 B1 | 5/2002 | Hoog et al. | | |
| 6,782,345 B1 * | 8/2004 | Siegel et al. | | 702/183 |
| 6,912,671 B2 * | 6/2005 | Christensen et al. | | 714/25 |
| 6,917,888 B2 | 7/2005 | Logvinov et al. | | |
| 7,088,137 B2 * | 8/2006 | Behrendt et al. | | 326/46 |
| 7,274,973 B2 * | 9/2007 | Nichols et al. | | 700/276 |
| 2002/0176184 A1 | 11/2002 | Cyrusian | | |
| 2003/0149728 A1 * | 8/2003 | Wewalaarachchi et al. | | 709/206 |
| 2003/0222982 A1 * | 12/2003 | Hamdan et al. | | 348/148 |
| 2005/0086341 A1 * | 4/2005 | Enga et al. | | 709/224 |
| 2007/0186569 A1 * | 8/2007 | Street et al. | | 62/132 |

* cited by examiner

*Primary Examiner* — Mark Rinehart
*Assistant Examiner* — Mohammad Anwar
(74) *Attorney, Agent, or Firm* — Seager Tufte & Wickhem LLC

(57) ABSTRACT

Systems and methods for remotely diagnosing problems across the communications lines of an environmental control network using analog data analysis are disclosed. An illustrative system can include an executive controller, a communications bus including a number of communications lines connecting the controller to one or more slave modules, an analog-to-digital converter, and a diagnostics module for diagnosing problems on one or more of the communications lines from a remote location. The analog input lines for the analog-to-digital converter can be connected to the communications lines and one or more other sources. The diagnostics module can include various diagnostic tools that can be used to diagnose problems occurring across the communications lines as well as to determine other information about the system.

24 Claims, 13 Drawing Sheets

REMOTE COMMUNICATIONS DIAGNOSTICS USING ANALOG DATA ANALYSIS

FIELD

The present invention relates generally to the field of control systems. More specifically, the present invention pertains to systems and methods for remotely diagnosing problems across the communications lines of a control system using analog data analysis.

BACKGROUND

Environmental control systems are employed within office buildings, manufacturing facilities, or other such locations where the monitoring and control of heating, ventilation, air-conditioning, fluid flow, air quality, lighting, and/or security is desired. In HVAC systems, for example, such control systems can be used to regulate the air temperature within multiple zones of a building or structure using a number of networked electronic thermostat modules. In the control of refrigeration systems, such control systems can be used to regulate a number of compressors or gas coolers for cooling a desired space within a building or structure. In some systems, a building executive controller can be provided to facilitate connectivity and control over multiple such systems via a single portal such as an operator workstation or terminal. Such executive controllers are typically connected to a number of slave modules via a communications bus operating on a suitable platform such as RS-485, allowing digital data to be transmitted back and forth over relatively long distances across the communications lines of the bus.

The ability to monitor analog signals sent across the communications lines of the bus is sometimes useful in diagnosing and repairing communications problems that can occur from an improper installation job and/or from noise or interference from a nearby component. In some circumstances, for example, such noise can be introduced over the communications lines due to the improper shielding of one of the communications cables and/or from the installation of another device located near the executive controller. Such noise may be particularly prevalent in large buildings or facilities where relatively long cables or wires are employed. In some applications, the improper grounding or installation of one of the control modules or actuators may introduce noise across the communications lines resulting in lower bandwidth and, in some cases, data loss.

The resolution of many of these problems typically requires an on-site visit by a technician equipped with an oscilloscope, line monitor, multi-meter, or other field diagnostic tool. Such on-site visits often increases the costs associated with servicing the control system and can delay the resolution of the problem for a period of time, affecting operations within the building or structure.

SUMMARY

The present invention pertains to systems and methods for remotely diagnosing problems across the communications lines of a control system using analog data analysis. An illustrative system for diagnosing problems across the communications lines of an environmental control network can include an executive controller, a communications bus having a number of communications lines connecting the controller to one or more slave modules, an analog-to-digital (A/D) converter having a number of analog input lines connected to the communications lines, and a means for remotely diagnosing problems on one or more of the communications lines.

The executive controller can be equipped with a built-in diagnostics module that can be used to diagnose problems on the communications lines. The diagnostics module can include software and/or hardware adapted to run a diagnostics algorithm or routine for automatically diagnosing problems occurring over the bus. In some embodiments, for example, the diagnostics module can be tasked to diagnose the presence of a ground fault, a short, and/or the presence of noise on one or more of the communications lines by scanning the analog line inputs to the A/D converter, and then comparing the output signals received from the converter against a table or list of expected values. Monitoring and diagnosis of any problems occurring on the communications lines can be accomplished on-site via a graphical user interface or diagnostics port provided on the executive controller and/or from a remote operator workstation connected to the executive controller. In some embodiments, a memory unit can be provided for storing data from the A/D converter that can later be used for diagnosing communications problems.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of systems and methods are illustrated in the various views, those skilled in the art will recognize that many of the examples provided have suitable alternatives that can be utilized. Moreover, while the various views are described specifically with respect to environmental control networks for controlling HVAC systems, it should be understood that the systems and methods described herein could be applied to the control of other types of systems, if desired.

Figure 1:
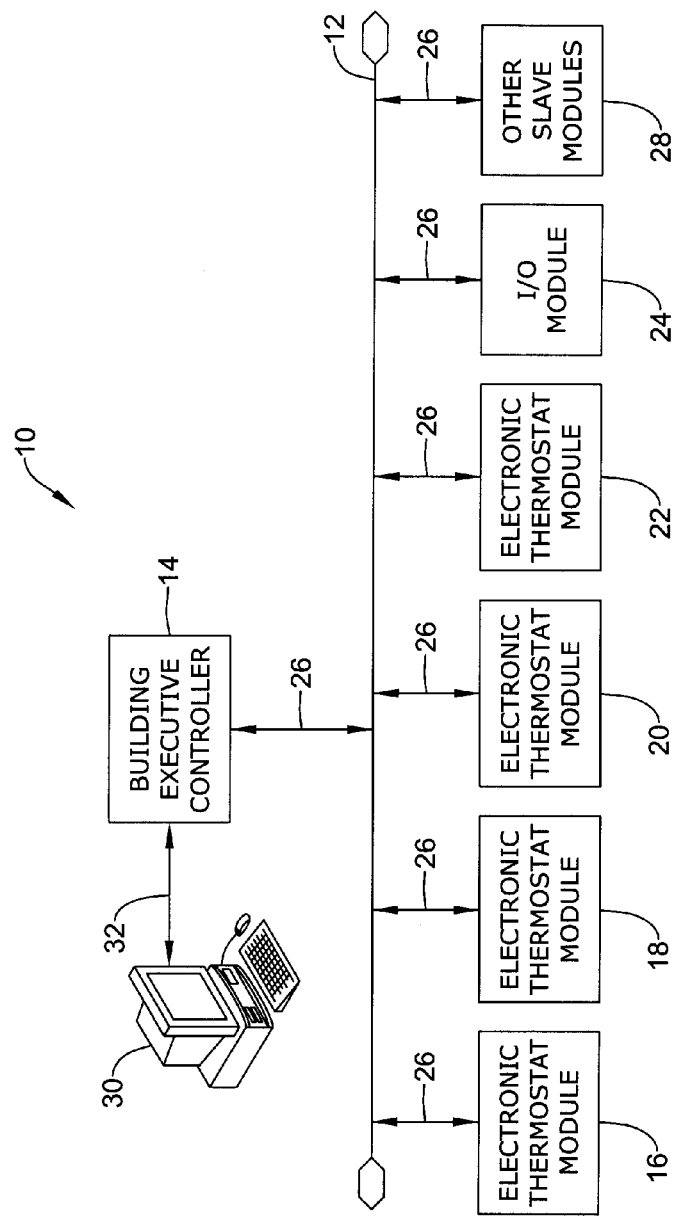
FIG. 1 is a block diagram showing an illustrative environmental control network for use in controlling an HVAC system.

Referring now to FIG. 1, a block diagram showing an illustrative environmental control system 10 for use in controlling an HVAC system will now be described. As shown in FIG. 1, the control system 10 can generally include a communications bus 12 connecting a building executive controller 14 to a number of electronic thermostat modules 16,18, 20,22 and an input/output (I/O) module 24. The communications bus 12 may comprise, for example, a differential communications bus including a number of communications lines 26 operating on a suitable platform such as RS-485, which facilitates differential digital data exchange between each node on the bus 12. Depending on the number of nodes and the distance of the communications lines 26, other data transmission platforms such as RS-422 or RS-232 may be utilized in certain circumstances.

The executive controller 14 can provide a number of executive level functions for controlling each of the thermostat modules 16,18,20,22 in a desired manner. In some HVAC systems, for example, the executive controller 14 can be configured to control each of the thermostat modules 16,18, 20,22 to provide independent temperature and ventilation control over a number of different zones within a building or structure. The executive controller 14 can also be configured to control other slave modules 28 forming the HVAC system or some other system to be controlled. In some applications, for example, the executive controller 14 can further provide executive control over a security system module installed within the building or structure for monitoring the operation of security gates, doors, windows, elevators, and so forth.

The input/output (I/O) module 24 provides an on-site interface for setting various operating parameters within the building or structure. In some HVAC systems, for example, the I/O module 24 can include a means for programming various operating parameters for controlling the thermostat modules 16,18,20,22 in a desired manner, including the selection of temperature and humidity setpoints, air-flow parameters, and filtering parameters. The I/O module 24 can also be configured to receive input commands for the control of other aspects of the control system 10. Although depicted as a separate component in FIG. 1, the I/O module 24 can be integrated into one of the thermostat modules 16,18,20,22, or may be provided directly as an interface to the executive controller 14, if desired.

The executive controller 14 can be connected to a remote operator workstation 30, which allows each device connected to the communications bus 12 to be monitored and controlled from a remote location away from the building or structure containing the executive controller 14 and slave modules 16,18,20,22,24,28. Connection of the operator workstation 30 to the executive controller 14 can be accomplished, for example, via a wired or wireless connection 32 using the Internet, an Ethernet cable, universal serial bus (USB) cable, serial cable, parallel cable, coaxial cable, telephone line, wireless router, or other suitable means for transferring data. The operator workstation 30 can comprise a personal computer, terminal, network server, laptop, personal digital assistant (PDA), cell-phone, pager, or other suitable means for interacting with the control system 10. The operator workstation 30 can include a graphical user interface (GUI) adapted to present various messages, operating parameters, or other such data to an operator tasked with monitoring the control system 10 from another location. In some embodiments, for example, the GUI may comprise a web-based GUI that can be accessed via an Internet portal. The operator workstation 30 can include various software and/or hardware functionality for interacting with the executive controller 14 and slave modules 16,18,20,22,24,28, which as discussed in greater detail below can be used to diagnose problems occurring across the communications lines 26 of the bus 12.

Figure 2:
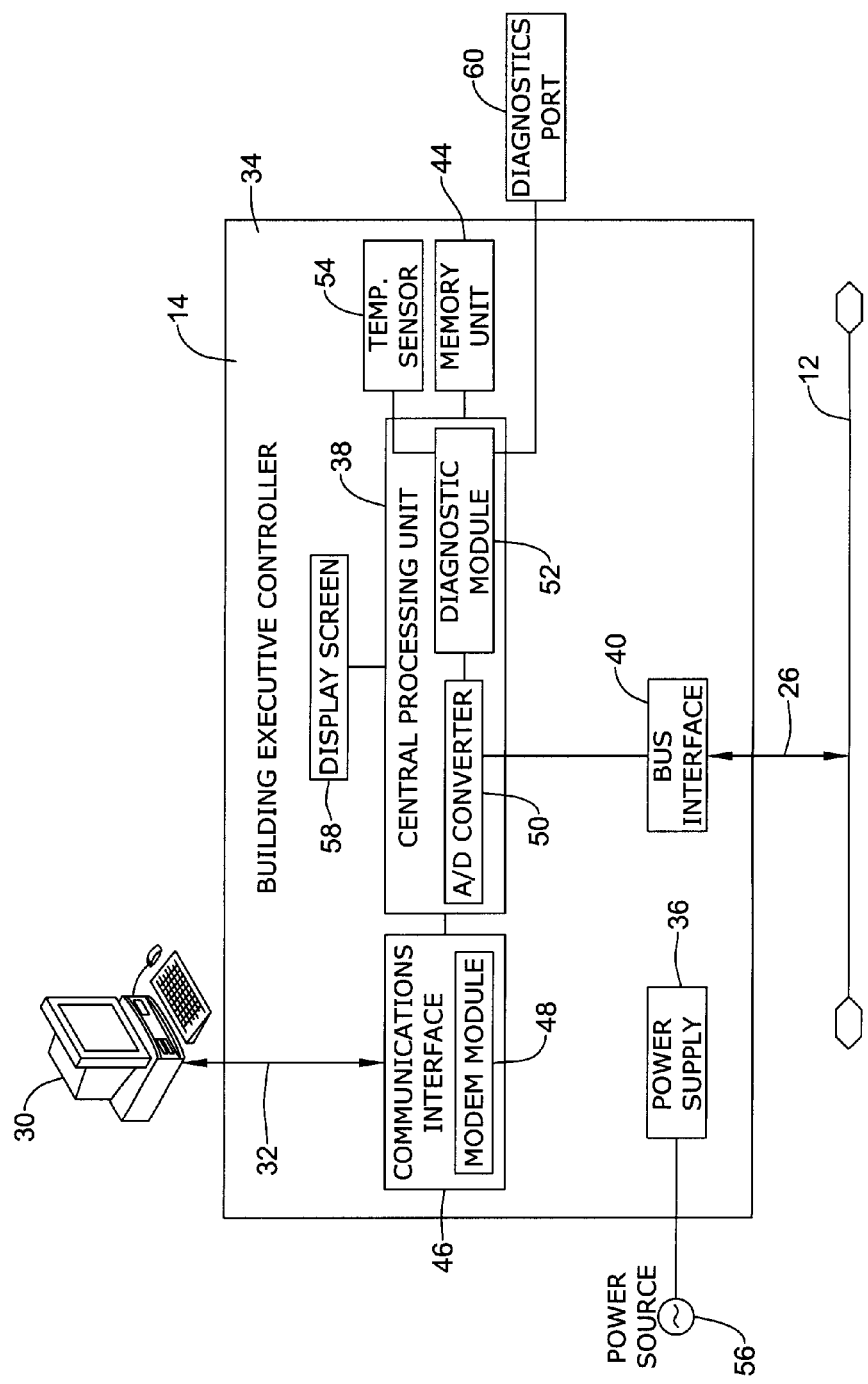
FIG. 2 is a block diagram showing several illustrative components of the executive controller of FIG. 1.

FIG. 2 is a block diagram showing several illustrative components of the executive controller 14 of FIG. 1. As shown in FIG. 2, the executive controller 14 can include a main I/O base board 34 equipped with power supply 36, a central processing unit 38, a bus interface 40, and a main memory unit 44 for storing various programming parameters as well as various data sent across the communications bus 12. A communications interface 46 including a modem module 48 can be provided for sending and receiving data to and from the operator workstation 30 via the wired or wireless connection 32.

The communications bus 12 and bus interface 40 can be connected to an on-board analog-to-digital (A/D) converter 50, which can be used to diagnose communications errors or faults as well as the presence of any noise or interference on the communications bus 12 using a built-in diagnostics module 52. The A/D converter 50 can be provided as part of the executive controller 14, or alternatively can comprise a separate component from the controller 14. During operation, and in some embodiments, the output of the A/D converter 50 can be analyzed by the diagnostics module 52 to determine the existence of any problems with the digital data transmitted across the communications bus 12 using analog data analysis of the output signal from the A/D converter 50.

The diagnostics module 52 can include various software and/or hardware functionality for analyzing the output from the A/D converter 50, and then outputting a response that can be received by the technician on-site at the executive controller 14 and/or remotely via the operator workstation 30. In some embodiments, for example, the output from the A/D converter 50 can be analyzed by the diagnostics module 52 to determine whether one of the communications lines 26 is shorted to ground, whether a ground loop problem exists on one of the communications lines 26, whether noise or other interference is present on one of the communications lines 26, or whether other problems reducing reliability or baud rate across the communications bus 12 are present.

The diagnostics module 52 can be configured to present the output data from the A/D converter 50 to the technician via an LED display, LCD display, CRT display, or other suitable display means. The output from the diagnostics module 52 may be in the form of a number or code which can be understood using a look-up table stored within memory 44, or may be in the form of text messages indicating the general nature of the problem detected. In the latter case, for example, the diagnostics module 52 can be configured to output a message to a display screen indicating "Ground fault error on COMM Line 2" or "Ground short on COMM Line 5". The diagnostics module 52 can be configured to output other messages relating to other aspects of the system such as the temperature sensed via an on-board sensor 54 located within the executive controller 14 or the status of the power source 56 supplied to the power supply 36.

In some embodiments, the diagnostics module 52 can be configured to output graphical traces representing the output signals from the A/D converter 50, allowing the technician to make various measurements for diagnosing the source of problems occurring across one or more of the communications lines 26. These traces can then be viewed by the technician either on-site via a display screen 58 of the executive controller 14 and/or remotely via the operator workstation 30, as desired.

The diagnostics module 52 can be configured to run a diagnostics algorithm or routine for automatically detecting and analyzing various problems occurring across the communications bus 12. In some embodiments, for example, the diagnostics module 52 can be pre-programmed with various diagnostics routines that check for ground fault errors or power spikes across each of the communications lines 26, the presence of any temporarily or permanent data losses across the lines 26, or other such communications problems. The memory unit 44 can comprise a RAM, DRAM, EEPROM, compact flash memory, or other suitable read/write memory capable of storing the diagnostics algorithms or routines used by the diagnostics module 52. During operation, the built-in diagnostic tools provided by the diagnostics module 52 can be used as an aid to troubleshoot problems occurring across the communications lines 26 as well as to monitor the status or health of other aspects of the control system 10. In some cases, the built-in diagnostic tools may permit the technician to diagnose and solve problems remotely, reducing the cost and time associated with scheduling an on-site visit.

The memory unit 44 can be configured to store information received from the A/D converter 50 for later analysis using the diagnostics module 52. In some embodiments, for example, the memory unit 60 can be configured to store data received from the A/D converter 50 for a period of time (e.g. 15 minutes, 30 minutes, 1 hour, etc.), which can later be retrieved and analyzed when an error, fault or other such problem is detected on the communications bus 12. If, for example, a data loss is detected across one of the communications lines 26, analog information for that line 26 stored within the memory unit 44 can then be recalled in a last-in first-out (LIFO) manner for further analysis by the technician and/or diagnostics module 52 in order to diagnose the source of the problem.

A diagnostics port 60 on the executive controller 14 can be provided to permit the technician access to the built-in diagnostics module 52 for diagnosing any problems across the communications bus 12. In some embodiments, for example, the diagnostics port 60 can comprise one or more wired and/or wireless connection ports that permit the technician to measure the status or health of the communications bus 12 using an oscilloscope, line monitor, multi-meter or other field diagnostics tool. Examples of such connection ports can include, but are not limited to, an Ethernet port, USB port, IEEE1395 (FireWire) port, serial port, parallel port, and an infrared port.

Figure 3A:
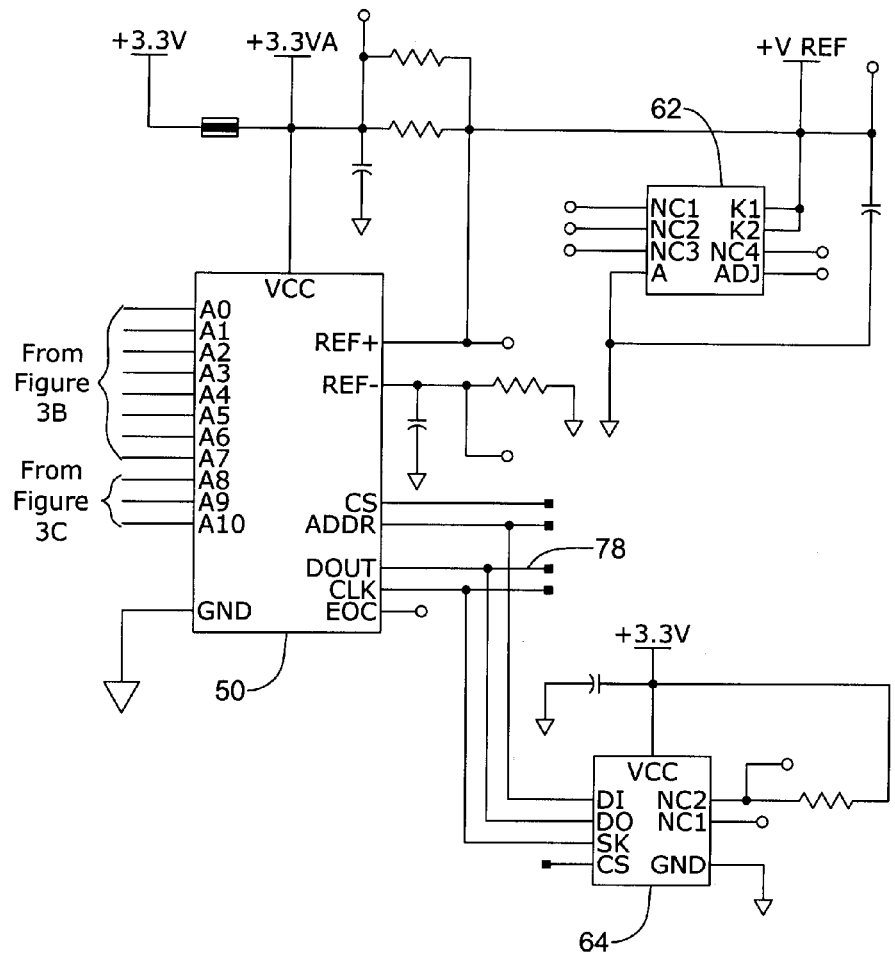
FIGS. 3A-3C illustrate a schematic diagram showing the various inputs to the illustrative analog-to-digital converter of FIG. 2.
Figure 3B:
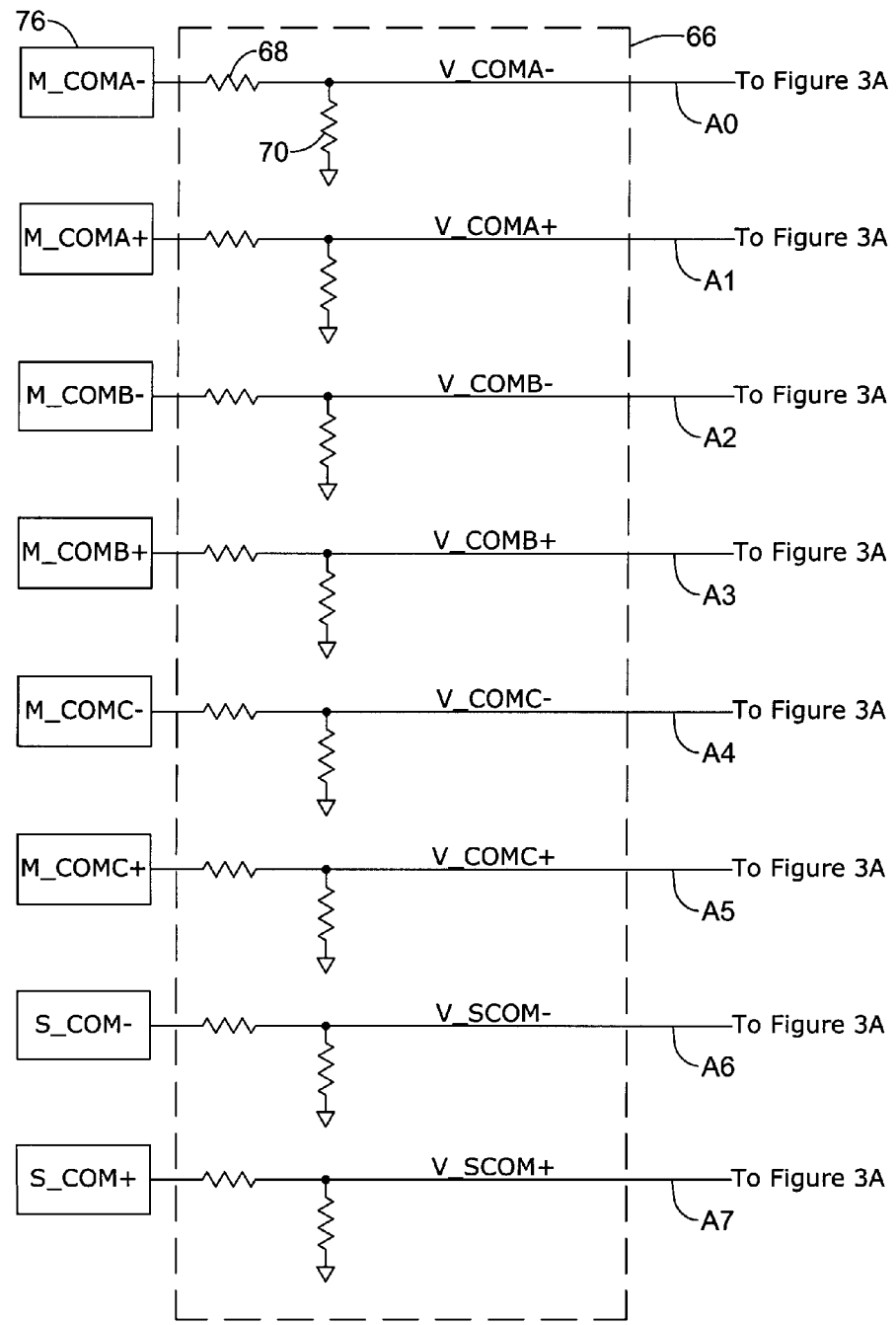
Figure 3C:
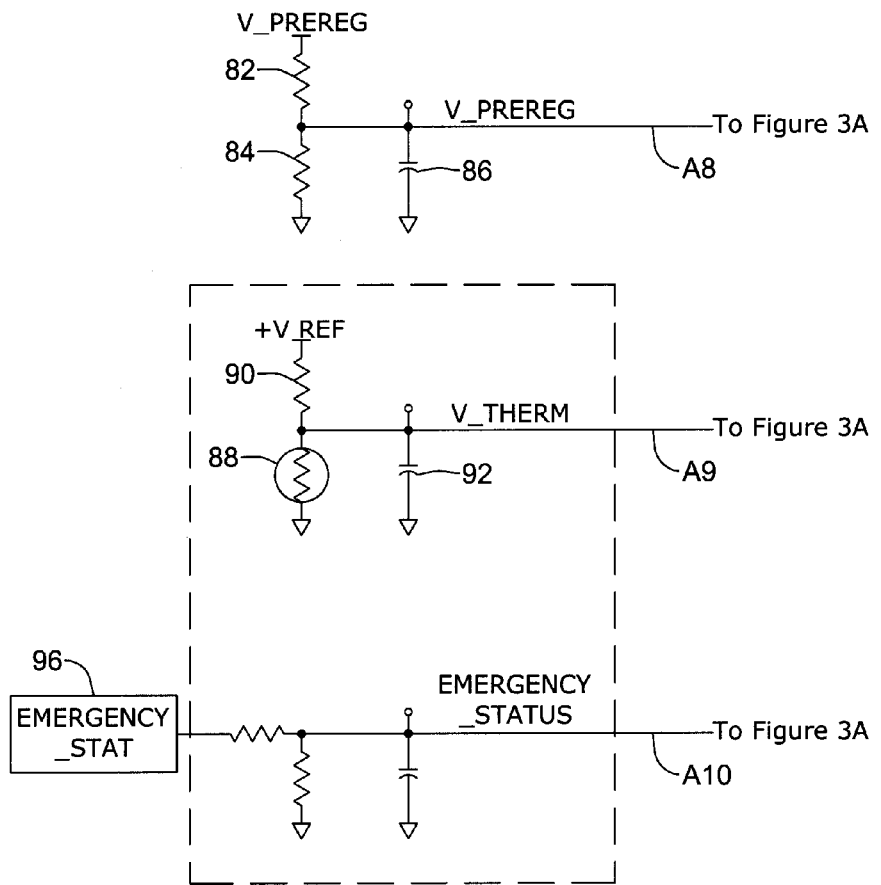

FIGS. 3A-3C illustrate a schematic diagram showing the various inputs to the illustrative A/D converter 50 of FIG. 2. As shown in FIG. 3A, the A/D converter 50 can comprise an 11 channel A/D converter with analog line inputs labeled A0 through A10 and the output terminal labeled DOUT. The positive reference voltage terminal REF+ and supply voltage terminal VCC for the A/D converter 50 can be connected to an integrated reference circuit 62, which functions as a shunt regulator for controlling the power supplied to the converter 50. Other terminal inputs and outputs common to A/D converters such as a chip-select terminal CS, a serial control address terminal ADDR, an I/O clock terminal CLK, and an end of conversion terminal EOC can be further provided, as shown. The digital output terminal DOUT, I/O clock terminal, and serial control address terminal ADDR of the A/D converter 50 can be connected to the central processing unit 38, which coordinates various instruction codes and parameter values for operating the A/D converter 50 and an electrically erasable programmable read only memory (EEPROM) 64.

As indicated generally by the dashed box 66 in FIG. 3B, each of the first eight analog line inputs A0-A7 can be connected to a corresponding communications line on the communications bus. With respect to the illustrative control system 10 of FIG. 1, for example, analog line inputs A0-A7 may correspond to the positive and negative lines for each of the four thermostat modules 16,18,20,22 on the communications bus 12. While an eleven channel A/D converter 50 is shown in the illustrative embodiment depicted in FIG. 3, it should be understood that a greater or lesser number of analog input lines can be employed. Moreover, while a single A/D converter 50 is depicted, it should be understood that multiple converters could be employed to convert analog signals received from the communications lines and/or from other sources. In one such embodiment, for example, a first A/D converter can be dedicated to monitoring analog signals across the communications lines whereas a second A/D converter can be provided for monitoring other aspects of the control system.

A number of resistors 68,70 on each analog input line A0-A7 form a resistor divider circuit for scaling analog signals fed to the A/D converter 50 and to reduce the load on the communications lines. When no analog signal is present, such resistor divider circuit further acts to sink the analog line input load to ground. In those embodiments where a differential communications bus such as an RS-485 communications bus is employed, the input nodes 76 for each analog line input can be connected to a differential bus transceiver to facilitate bidirectional data communications across the communications lines.

During operation, analog data transmitted over the communications lines are fed via the analog input lines A0-A7 to the A/D converter 50, which serially converts the data from each communications line into digital form for further processing by the built-in diagnostics module 52 described hereinabove with respect to FIG. 2. The digital signal 78 outputted by the A/D converter 50 thus has a digital value corresponding to the value of the analog signal transmitted across each of the communications lines. In some embodiments, the A/D converter 50 can be configured to perform various preprocessing operations on the digital signal 78 before being outputted to the diagnostics module 52 for further processing and/or analysis.

Using the digital signal 78 outputted by the A/D converter 50, the integrity, quality, and reliability of the communications lines can then be determined vis-à-vis the diagnostics module using the analog data analysis steps described herein. In some embodiments, for example, data analysis of the signals 78 outputted by A/D converter 50 can be utilized to detect the presence of a short, a ground fault, noise, or other such problem occurring on one or more of the communications lines. In some techniques, such data analysis can be accomplished without interrupting the digital data being transmitted across the communications lines, allowing the technician and/or diagnostics module to detect the occurrence of a communications problem during data transfer. In other techniques, such data analysis can be accomplished by temporarily halting data communications across the communications lines and then monitoring the analog signals on the lines to detect the occurrence of a communications problem.

In addition to monitoring the communications lines for communications problems occurring across the communications bus, the A/D converter 50 can be further connected to one or more other analog input signals for monitoring other aspects of the control system, if desired. In FIG. 3C, for example, analog input line A8 is shown connected to a filtered, unregulated power source input node VPREREG, which can be scaled down via a number of resistors 82 and 84 and a capacitor 86 to determine various aspects of the power being supplied to the executive controller 14. In some applications, for example, such analog information can be used to determine the power line voltage level to the executive controller, the presence of any power line interruptions or abnormalities to the controller, and/or the current loading on the transformer for the controller. If desired, other aspects of the power supply can be monitored via analog input line A8 to diagnose other problems with the control system.

An on-board thermistor 88 connected to analog input line A9 can be further provided in some embodiments to monitor the operating temperature within the executive controller. The thermistor 88 can be powered via a referenced voltage source VREF to permit slight temperature fluctuations (e.g. ±1%) to be sensed within the executive controller. A resistor 90 and capacitor 92 can be further provided, which in addition to the thermistor 88, form a resistor divider circuit for scaling the load to the A/D converter 50 and communications lines. During operation, variations in thermistor resistance due to changes in temperature within the controller interior can be used to monitor for problems occurring with the executive controller. In some embodiments, such temperature information can be logged over a period of time and/or can be acquired at multiple building locations to diagnose problems that may occur at certain periods such as during the winter or summer months.

An emergency input node 96 to the A/D converter 50 can be provided as either an analog or digital input line to receive various other signals or commands for diagnosing other problems with the control system 10. In some embodiments, for example, such emergency input node 96 may permit the technician to diagnose problems with one of the slave modules connected to the executive controller, or to diagnose problems with one or more actuators controlled by such modules.

Figure 4:
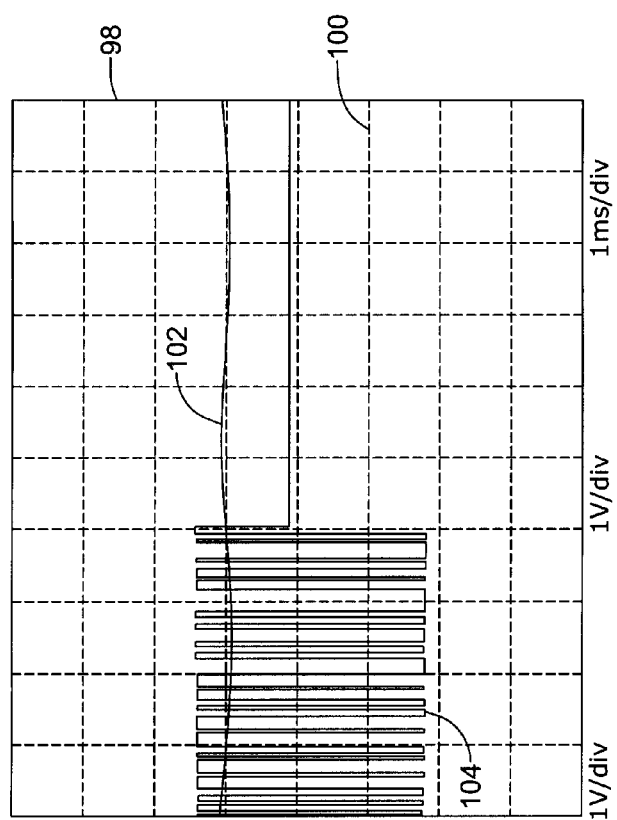
FIG. 4 is a graph showing sample waveform traces outputted by the analog-to-digital converter of FIG. 3 during normal operation.
Figure 5:
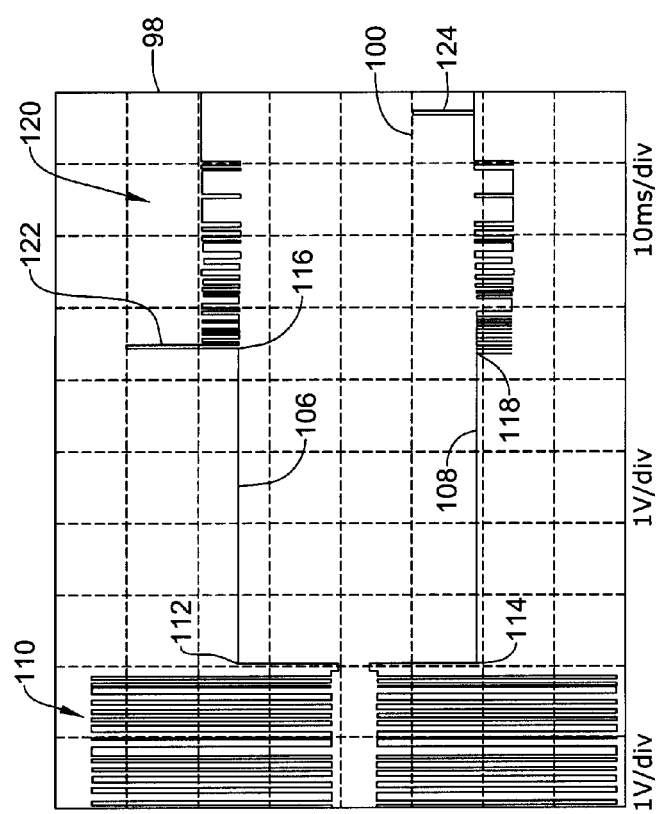
FIG. 5 is a graph showing the waveform traces for the positive and negative sides of one of the communication lines at the time the executive controller sends a command.

FIGS. 4-5 are graphs showing several sample waveforms outputted by the A/D converter 50 of FIG. 3. These graphs may represent, for example, the graphical output from the built-in diagnostics module 52 described above with respect to FIG. 2 as viewed on a display screen 98 of the remote operator workstation 30. As shown in each of the graphs in FIGS. 4-5, the diagnostics module 52 can be configured to draw an oscilloscope-like graticule 100 on the display screen 98, presenting information scanned from the A/D converter 50 in a voltage-vertical, time-horizontal graphical format. The different analog line inputs A0-A10 can be differentiated on the display screen 98 using different line colors or using a different line format such as solid lines, dashed lines, flashing or blinking lines, different line thicknesses, etc. Labels for each of the analog line inputs can be further provided on the display screen, if desired.

In a first graph depicted in FIG. 4, the output from the connection of analog line input A8 to the unregulated power source input node VPREREG is represented generally by waveform trace 102 on the display screen 98, which has a characteristic 60 Hz ripple indicating that power is being supplied to the executive controller. The analog line input A0 for one of the communication lines, in turn, is represented generally by waveform trace 104 on the display screen 98, which shows the response of the communications line at the time the executive controller sends a command across the communications bus to one of the slave modules. Waveform trace 104 may represent, for example, the positive side waveform of the communications line 26 connecting thermostat module 16 to the executive controller 14 of FIG. 1.

FIG. 5 is a graph showing the analog line input (e.g. A0 and A1) waveforms for the positive and negative sides of one of the communication lines at the time the executive controller sends a command. As shown in FIG. 5, the output for the positive side of the communications line can be represented generally by waveform trace 106 located on the top of the display screen 98. The output for the negative side of the communications line, in turn, can be represented generally by waveform trace 108 located on the bottom portion of the display screen 98. In FIG. 5, the time rate has been slowed down slightly from that depicted in FIG. 4 in order to show both the command from the executive controller as well as the response from the slave module on the display screen 98.

The response of the A/D converter 50 at the moment the executive controller sends a command via the communications bus can be seen at segment 110 in FIG. 5, which shows a relatively large waveform on the display screen 98. At the conclusion of the executive command, and as shown generally by points 112 and 114 on the waveform traces 106,108, a relatively flat output response can be seen by the A/D converter 50, indicating the period of time between when the command is sent by the executive controller and a response is sent back from the slave module. As the commands are sent back by the slave module beginning at points 116 and 118, a response is again seen in the output of the A/D converter 50. At segment 120, the signals sent across the communications lines from the slave module are attenuated slightly due to the line attenuation. A fast noise can be further seen periodically during this time period, as can be seen, for example, at points 122 and 124 on the waveform traces 106,108. Such fast noise may represent, for example, a ringing at a frequency of about 1 MHz in response to an executive command signal sent at 9600 baud.

Figure 6:
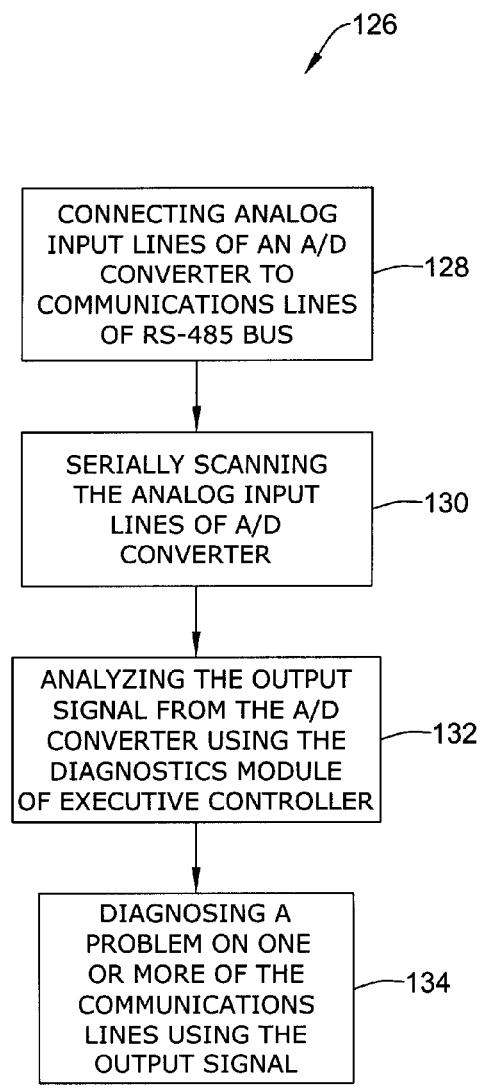
FIG. 6 is a block diagram showing an illustrative method of diagnosing a problem across the communications lines of a control system.

Referring now to FIG. 6, a block diagram showing an illustrative method 126 for diagnosing problems across the communications bus of a control system installed within a building or structure will now be described. Method 126 may begin generally at block 128 by connecting the analog input lines of an A/D converter to the communications lines used by the control system to send digital data back and forth between an executive controller and one or more slave modules. The A/D converter may be provided as a part of an executive controller having a built-in diagnostics module for detecting and analyzing communications problems occurring across the communications lines. Alternatively, and in other embodiments, the A/D converter may be provided as a stand-alone module separate from the executive controller.

To monitor the analog signals transmitted across the communications bus, the A/D converter can be configured to scan each of the communications lines, as indicated generally by block 130. In some embodiments, for example, the A/D converter can be configured to scan each communication line serially, and then store the output from each line into a memory unit for later use by a technician and/or the diagnostics module.

As indicated generally by block 132, the output data from the A/D converter can then be analyzed using the diagnostics module of the executive controller. Analysis of the analog data fed to the A/D converter can be performed either in real-time or at a later time using output data stored within memory. In the later case, for example, output data stored within a memory unit can be recalled for a certain period of time (e.g. 30 minutes) in order to troubleshoot an intermittent communications problem occurring across that line. Using the analyzed output data received from the diagnostics module, the technician can then diagnose the source of the problem, as indicated generally by block 134. Once diagnosed, the technician can then perform any maintenance necessary to correct the problem.

Figure 7:
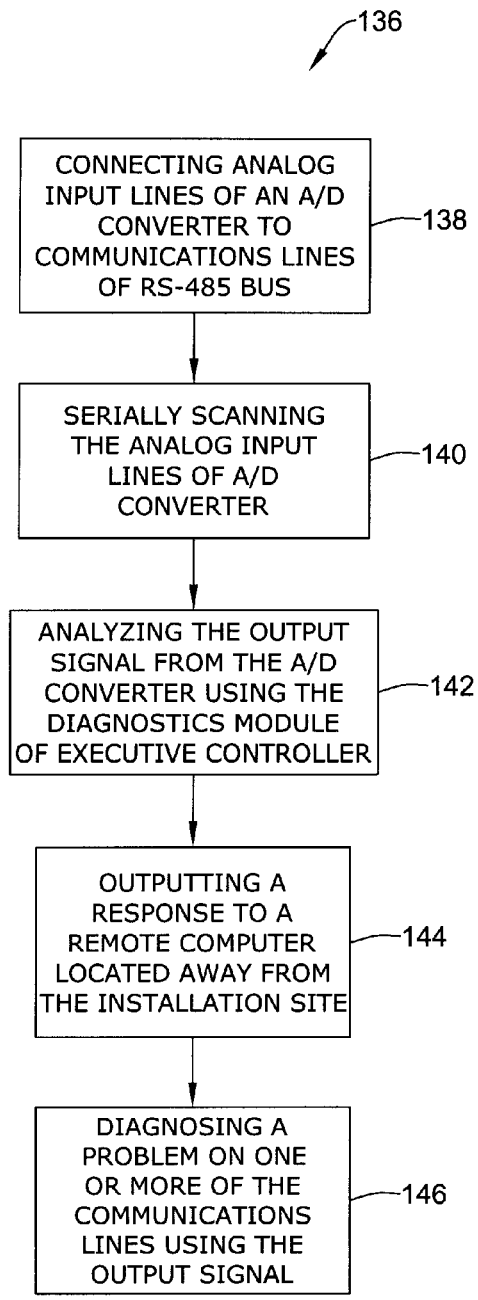
FIG. 7 is a block diagram showing another illustrative method of diagnosing a problem across the communications lines of a control system.

FIG. 7 is a block diagram showing another illustrative method 136 for diagnosing problems across the communications bus of a control system. Method 136 is similar to that described above with respect to FIG. 6, beginning at block 138 with the step of connecting the analog input lines of an A/D converter to the communications lines used by the control system to send digital signals back and forth between the executive controller and one or more slave modules. Once connected, the A/D converter can be configured to serially scan each of the communications lines, as indicated generally by block 140. The output data from the A/D converter can then be analyzed using the diagnostics module of the executive controller either in real-time or from stored data contained within the memory unit, as indicated generally by block 142.

In the illustrative embodiment of FIG. 7, the diagnostics module for the executive controller can be configured to output a response to a remote computed located away from the installation site of the control system, as indicated generally by block 144. In some embodiments, for example, the diagnostics module can be configured to output a message to a remote operator workstation informing an operator of a potential problem detected on one or more of the communications lines. The output data may also be outputted in graphical form similar to that described above with respect to FIGS. 4-5. Using the analyzed output data received form the diagnostics module, and as indicated generally by block 146, the operator can then diagnose the source of the problem from the remote location and dispatch a technician if further maintenance is necessary to correct the problem on-site.

Figure 8:
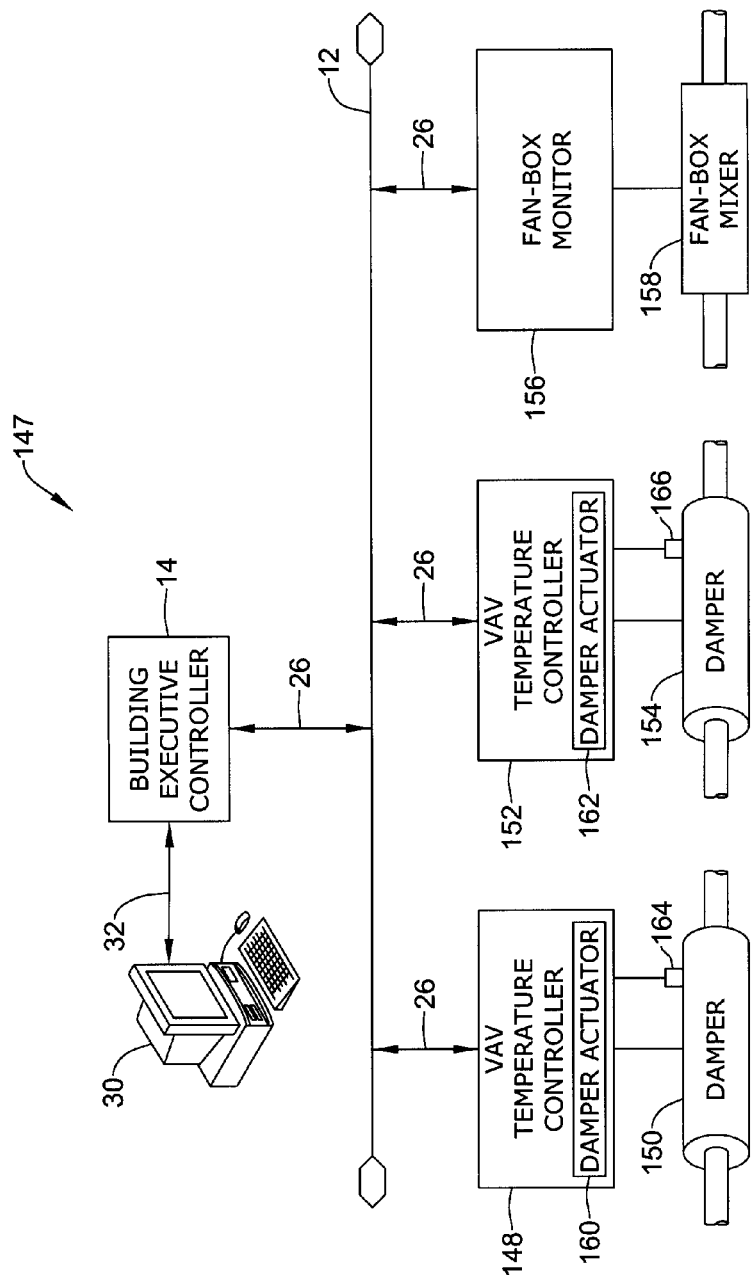
FIG. 8 is a block diagram showing an illustrative HVAC system employing a number of VAV temperature controllers.

Referring now to FIG. 8, the illustrative diagnostics method of FIG. 7 will now be described with respect to a communications problem occurring in an exemplary HVAC control system 147 employing a number of variable air volume (VAV) control modules. As shown in FIG. 8, the HVAC system 147 can include a first VAV temperature controller 148 for controlling a first damper mechanism 150, a second VAV temperature controller 152 for controlling a second damper mechanism 154, and a fan-box monitor 156 for controlling a fan-powered mixing box assembly 158. A number of air-flow sensors 164,166 can be connected to each of the VAV temperature controllers 148,152 for monitoring the air-flow within the ducts at or near each of the damper mechanisms 150,154. In the illustrative embodiment depicted, each of the VAV temperature controllers 148,152 has an integral damper actuator 160,162 for controlling the damper mechanisms 150, 154. In other embodiments, however, external damper actuators could be used in addition to, or in lieu of, the damper actuators 160,162 for controlling the damper mechanisms 150,154.

Figure 9:
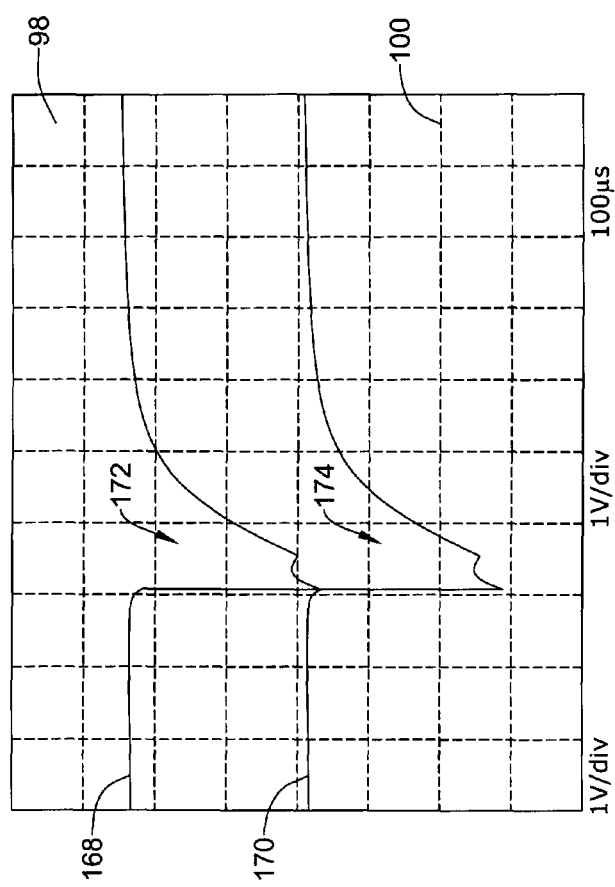
FIGS. 9-10 are graphs showing an exemplary communications problem occurring on the communications bus for the illustrative HVAC system of FIG. 8.
Figure 10:
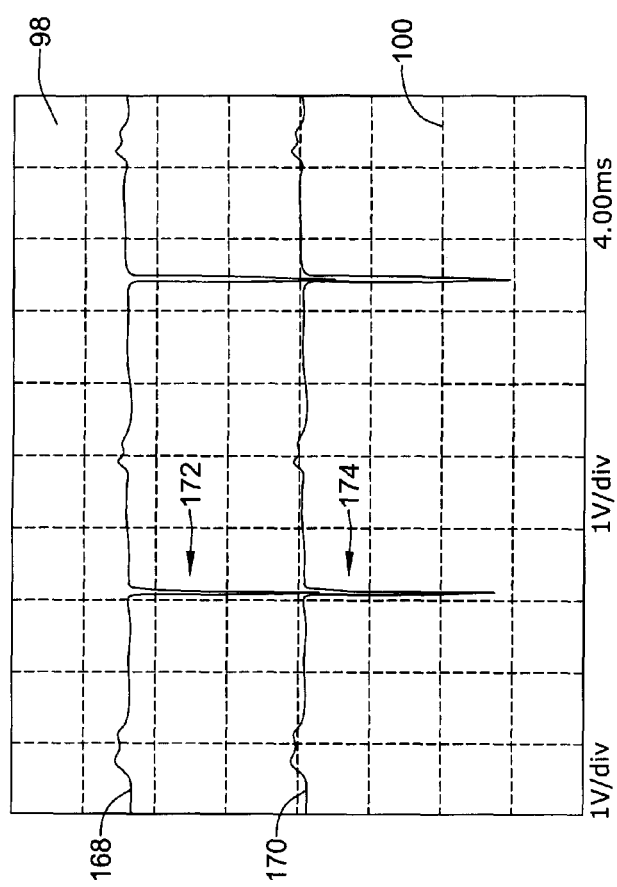

An example communications problem on one of the communications lines 26 for the illustrative HVAC system 146 will now be described with respect to FIGS. 9 and 10, which depict graphs indicating the presence of noise resulting from the improper grounding of one of the bus transceivers used to connect the VAV temperature controllers 148,152 to the communications bus 12. FIGS. 9 and 10 may represent, for example, screen plots from the display screen 98 of a remote operator workstation 30 connected to the executive controller 14.

As shown in a first view in FIG. 9, the diagnostics module for the executive controller 14 can be configured to output a number of waveform traces 168,170 on the display screen 98 showing the analog data across the communications lines 26 for each VAV temperature controller 148,152 in response to commands sent by the controller 14. In the particular view depicted in FIG. 9, the transceiver noise can be seen generally at segments 172 and 174 of the waveform traces 168,170, which show a time-varying fluctuation in the output signal received from the A/D converter.

FIG. 10 is another view showing the same waveform traces 168,170 as in FIG. 9, but with the sweep rate set higher to show the repetition rate in the signal received. As shown in FIG. 10, the transceiver noise transmitted across the communications line is at a rate of about 60 Hz, indicating the presence of a grounding problem with the transceivers used to couple the VAV temperature controllers 148,152 to the communications bus 12. Such grounding problem may result, for example, from a non-isolated transceiver on the VAV temperature controller 148,152 that is turned on by a voltage difference between shield ground and CPU ground, causing a communications loss in the airflow signal sent to the executive controller 14. Although the speed of the A/D converter is typically slow compared to the induced noise that can show up on the communications lines, the sample and hold nature of the input to the converter allows the noise to show up when sampled and reproduced on the display screen 98.

Figure 11:
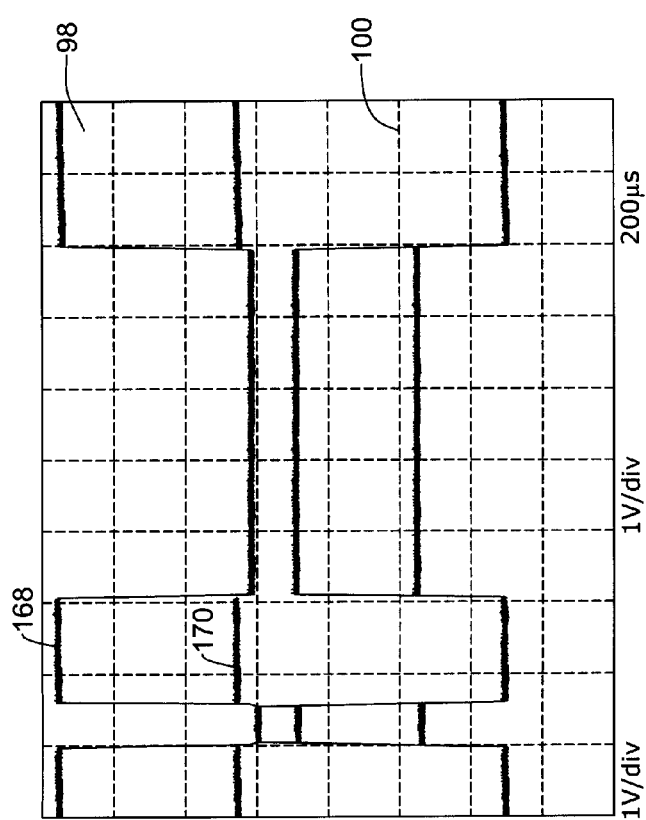
FIG. 11 is another graph showing the communications signal of FIGS. 9-10 once the communications problem has been corrected.

Once the particular communications line causing the problem is isolated, diagnostics of the communications problem can be accomplished using the diagnostics tools provided by the diagnostics module and a suitable field diagnostics tool such as a differential pressure sensor. The transceiver noise can then be corrected by finding the VAV temperature controller 148,152 having the grounding problem, and installing shorting jumpers between the shield and CPU grounds. A graph showing the positive and negative communications signals once the grounding problem with the transceiver has been corrected is further shown in FIG. 11, which illustrates the removal of the 60 Hz component in the waveform traces 168,170.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A method of remotely diagnosing a problem with an environmental control system installed within a building or structure, the environmental control system including an executive controller for at least in part controlling an HVAC system, the executive controller further configured to exchange digital data on a communications bus back and forth between the executive controller and at least one thermostat module, the method comprising the steps of:

having two or more analog input lines of an analog-to-digital converter connected to two or more corresponding communications lines of the communications bus;

converting each of the analog signals transmitted over the two or more communication lines into a corresponding digitized output signal using the analog-to-digital converter;

transmitting one or more of the digitized output signals to a remote workstation located remotely from the building and/or structure, and displaying the one or more digitized output signals on a display of the remote workstation; and diagnosing a problem from the remote location using the digitized output signals that are displayed on the display.

2. The method of claim 1, wherein said communications bus is a differential communications bus.

3. The method of claim 1, wherein the converting, transmitting and diagnosing steps are performed without halting digital communications across the communications lines.

4. The method of claim 1, wherein the converting, transmitting and diagnosing steps are performed after halting digital communications across the communications lines.

5. The method of claim 1, wherein said step of diagnosing the problem is accomplished at least in part automatically with an algorithm or routine of a diagnostics module running on the remote workstation.

6. The method of claim 1, wherein said step of diagnosing a problem includes displaying a number of graphical traces on the display representing the digitized output signals, and the diagnosing step includes performing a measurement on at least a portion of the graphical traces at the remote location.

7. The method of claim 1, further comprising the steps of:
sampling and holding the analog signals received from each analog input line until the analog signal is converted to a corresponding digitized output signal.

8. The method of claim 1, further comprising the steps of:
having one or more analog input lines of the analog-to-digital converter connected to at least one source not connected to the communications bus; and
monitoring one or more parameters of the environmental control system using analog signals produced from said at least one source.

9. The method of claim 8, wherein said at least one source includes an unregulated power source signal.

10. The method of claim 8, wherein said at least one source includes a temperature sensor.

11. The method of claim 1, wherein said environmental control system includes an HVAC system.

12. The method of claim 1, wherein said environmental control system includes a refrigeration system.

13. The method of claim 1, wherein said executive controller is a building executive controller.

14. A method of remotely diagnosing a problem across a communications bus of an environmental control system installed within a building or structure, the environmental control system including an executive controller for an HVAC system installed within the building or structure that is configured to exchange digital data on the communications bus with one or more slave modules, the method comprising the steps of:
having two or more analog input lines of an analog-to-digital converter connected to a corresponding number of communications lines of the communications bus, wherein the analog-to-digital converter is configured to convert each of the analog signals transmitted over the communication lines into a corresponding digitized output signal;
transmitting one or more of the digitized output signals to a remote computer located remotely from the building and/or structure, and displaying the one or more digitized output signals on a display of the remote computer in the form of one or more graphical traces;
wherein the executive controller is configured to allow an operator to interact with the executive controller of the HVAC system and/or the one or more slave modules via the remote computer; and
the executive controller is further configured to allow a user to view the one or more graphical traces on the display of the remote computer, and to assist in remotely diagnosing a problem with one or more of the communications lines using information displayed on the display of the remote computer.

15. The method of claim 14, further comprising:
storing the digitized output signals from the analog-to-digital converter into a memory;
recalling the stored digitized output signals for one or more of the communications lines upon the detection of a problem on the communications bus; and
diagnosing a problem on one or more of the communications lines using the recalled digitized output signals.

16. A system for diagnosing problems across one or more of a number of communications lines of an environmental control network installed within a building or structure, the system comprising:
an executive controller for controlling at least part of an HVAC system;
a communications bus including the number of communications lines, the number of communication lines connecting the executive controller to one or more thermostat modules and/or input/output modules, the communications bus configured to exchange digital data back and forth between the executive controller and the one or more thermostat modules and/or input/output modules;
an analog-to-digital converter having a number of analog input lines each connected to one of the number of communications lines of said bus, said analog-to-digital converter configured to convert each of the analog signals transmitted over the communications lines into a corresponding digitized output signal;
the executive controller is configured to allow an operator to interact with at least one of the executive controller, the thermostat module(s) and the input/output module (s) via a remote workstation located at a location away from the building or structure; and
the executive controller is further configured to transmitting one or more of the digitized output signals to the remote workstation, and to assist the operating in diagnosing problems indicated by one or more of the number of communications lines from the remote workstation.

17. The system of claim 16, wherein said communications bus is an RS-485 communications bus.

18. The system of claim 16, wherein the executive controller is configured to run an algorithm or routine for automatically diagnosing at least some problems indicated by one or more of the communications lines.

19. The system of claim 16, wherein the executive controller includes a built-in diagnostics module for diagnosing at least some problems indicated by one or more of the communications lines.

20. The system of claim 19, wherein said one or more digitized output signals are displayed as graphical traces on the display of the remote workstation.

21. The system of claim 20, wherein said remote workstation includes a thin client used for communicating with the executive controller.

22. The system of claim 21, wherein said thin client includes a web-based browser.

23. The system of claim 16, further comprising a memory unit for storing the digitized output signals from the analog-to-digital converter.

24. An executive building controller configured to be located within a building or structure for controlling at least part of an HVAC system, and for communicating with one or more HVAC modules over a communications bus having a number of communications lines, the executive building controller comprising:
- a processor;
- a communications block for communicating with the one or more HVAC modules over the communications bus;
- an analog-to-digital converter including a number of analog input lines to be connected to the communications lines, the analog-to-digital converter configured to convert each of the analog signals transmitted over the communication lines of the communications bus into a corresponding digitized output signal;
- a memory unit for storing the digitized output signals from the analog-to-digital converter; and
- an output block for outputting the digitized output signals stored in the memory to a remote computer located at a remote location outside and away from the building or structure, wherein the executive controller is configured to allow an operator of the remote computer to interactively control the executive building controller and to view the digitized output signals that result from such interactive control.

\* \* \* \* \*